United States Patent
Nanayakkara et al.

(10) Patent No.: US 8,987,932 B2
(45) Date of Patent: *Mar. 24, 2015

(54) DEEP WATER HYDRO-ELECTRIC POWER SYSTEM

(71) Applicants: Lakdas Nanayakkara, Boca Raton, FL (US); Pravin Nanayakkara, Boca Raton, FL (US)

(72) Inventors: Lakdas Nanayakkara, Boca Raton, FL (US); Pravin Nanayakkara, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/299,832

(22) Filed: Jun. 9, 2014

(65) Prior Publication Data
US 2014/0284933 A1 Sep. 25, 2014

Related U.S. Application Data

(63) Continuation-in-part of application No. 13/749,460, filed on Jan. 24, 2013, now Pat. No. 8,749,086.

(51) Int. Cl.
*F03B 13/00* (2006.01)
*F03B 13/10* (2006.01)
*F03B 17/00* (2006.01)

(52) U.S. Cl.
CPC ............. *F03B 13/10* (2013.01); *F03B 17/00* (2013.01); *Y02E 10/20* (2013.01); *F05B 2240/97* (2013.01); *Y10S 415/916* (2013.01)
USPC ................................. 290/54; 290/52; 415/916

(58) Field of Classification Search
USPC ...................................... 290/52, 54; 415/916
See application file for complete search history.

(56) References Cited

U.S. PATENT DOCUMENTS

| 8,523,487 B2* | 9/2013 | Georgiou et al. ........ 405/129.35 |
| 8,749,086 B2* | 6/2014 | Nanayakkara et al. ......... 290/54 |

* cited by examiner

*Primary Examiner* — Tho D Ta
(74) *Attorney, Agent, or Firm* — Melvin K. Silverman

(57) ABSTRACT

A deep-water power generation system includes an initially evacuated enclosure having walls of suitable strength or reinforcement for maintaining its structural integrity thereof in deep-water pressures; a power axle extending through the enclosure from a north pole to below a south pole of the enclosure; preferably concave blades of a turbine secured upon a support frame secured to the power axle in a latitudinal plane of the enclosure; and inlet ports within the enclosure positioned at the latitudinal plane of the blades of the turbine and receiving an inflow of ambient deep water against the blades, in which a couple effect of force from the fluid flow induces rotation of the blades and of the power axle secured to the frame. A thrust deck is rigidly secured, within the enclosure, to the power axle above the turbine and to a generator secured upon the thrust deck. At the south pole of the enclosure, water is expelled into a high-pressure injection well descending to a geological level of a saline aquifer or discharged from a water chamber at the south pole and into a main water body under pressure provided to a discharge chamber in excess of the ambient deep-water pressure.

22 Claims, 21 Drawing Sheets

US 8,987,932 B2

DEEP WATER HYDRO-ELECTRIC POWER SYSTEM

CROSS REFERENCE TO RELATED APPLICATION

This application is a continuation-in-part of application Ser. No. 13/749,460, filed Jan. 24, 2013, and the same is incorporated herewith in its entirety.

BACKGROUND OF THE INVENTION

1. Area of Invention

The invention relates to a method of generating electrical power by extraction of potential energy from a deep water environment.

2. Prior Art

The desire to develop new methods of generating electricity has been a driving force throughout recent human history. At present, there are two main methods of generating electricity each with its own challenges: one uses fuel as the energy source and the other utilizes natural phenomena. Fuel-based energy generation has problems of cost of the fuel as well as the polluting byproducts of such fuel consumption. Exemplary fuels used as the energy source for power generation include coal, natural gas, nuclear fuel, and petro-chemicals. The challenges associated with using natural phenomena as an energy source vary with the technology used. For example, solar and wind forces do not produce energy in a predictable amount and such energy is often generated during off-peak consumer demand. Hydroelectric power provides a source of energy that can be harvested when needed, but the damming of bodies of water causes significant environmental harm, nor is it readily responsive to power grid demand geometries. Other natural phenomena used to produce energy, for example, geothermal, ocean waves, ocean thermal and ocean buoyancy, are expensive to build and operate relative to the amount of energy they produce.

There are a few researchers who have utilized the potential energy from the gravitational force upon deep water to create pressure differentials between deep water and a lower pressure vessel therein to produce useful work or energy.

Various efforts however have appeared in the past to attempt to harness the absolute pressure as well as associated potential energy associated with the extreme pressures which exist in deep water environments. Representative examples of these efforts appear in WIPO publication WO 2011/005215 to Lam; U.S. Pat. No. 7,291,936 (2007) to Robson; U.S. Pat. No. 4,181,455 (1981) to Stanwick; and U.S. Pat. No. 7,188,471 (2007) to Walters.

None of the above efforts have been commercially successful.

It is accordingly an object of the present invention to provide a deep water power generation system which responds to the long-felt need which, inter alia, is reflected is reflected in the deficiencies in the art cited above in achieving this objective.

My above-referenced application Ser. No. 13/749,460, now U.S. Pat. No. 8,749,086, was limited in its energy output due to the requirement that the water expelled at the south pole thereof optimally possess about twice the pressure of the ambient sea or deep water within which the system operated. The present invention presents a solution to this issue using, as a discharge reservoir, so-called saline aquifers that exist deep within many geological formations. The only other use of saline aquifers known to the inventor is for $CO_2$ sequestration, an example of which appears in U.S. Pat. No. 8,523,487 (2011) to Georgiou et al.

SUMMARY OF THE INVENTION

A deep-water power generation system includes an initially evacuated enclosure having walls of suitable strength and reinforcement for maintaining the structural integrity thereof in deep-water pressures. Further included is a power axle extending through said enclosure from a north pole thereof to below a south pole of said enclosure. Within the enclosure is a multiplicity of blades of a turbine secured upon a support frame secured to said axle in a latitudinal plane of said enclosure. Also provided are a plurality of inlet ports within said sphere positioned at said latitudinal plane of said blades of said turbine and defining a direction of inflow of ambient deep water against said blades which are preferably cup-shaped in which energy from said fluid flow induces rotation of said blades, their said support frame and said power axle rotationally secured within said frame. The system also includes a thrust deck rigidly secured, within said enclosure, to said power axle and above said turbine. A generator secured upon said thrust deck, its axis of rotation defined by said power axle extending therethrough. A fluid power output is defined at a south pole of said enclosure which output proceeds to substantial alignment with the gravity vector to a well-head of a reinforced conduit passing downwardly through various geological formations to a saline aquifer beneath a seabed of an ocean or deep lake.

It is an object of the invention to utilize potential energy in deep water, and other deep water environments, which exists at considerable pressure by providing an enclosure capable of withstanding extreme pressures at a working depth.

It is another object to provide a durable and economical power system to extract power from high absolute pressures which exist within the ocean and other bodies of deep water.

It is a further object to employ otherwise unused geological saline aquifers as low pressure receivers of water expelled at the south pole of the enclosure.

It is a yet further object to provide a power system which converts potential energy of the ocean, or fresh water at depth, to kinetic energy and thus useable electric power.

It is a still further object of the invention to provide a prime mover for both general use and by submersibles.

It is a yet further object to provide a system which enables the provision of significantly greater quantities of total energy to be put to work than heretofore in prior art conventional and deep water hydraulic power systems.

The above and yet other objects and advantages of the present invention will become apparent from the hereinafter set forth Brief Description of the Drawings, Detailed Description of the Invention, and Claims appended herewith.

Figure 12:
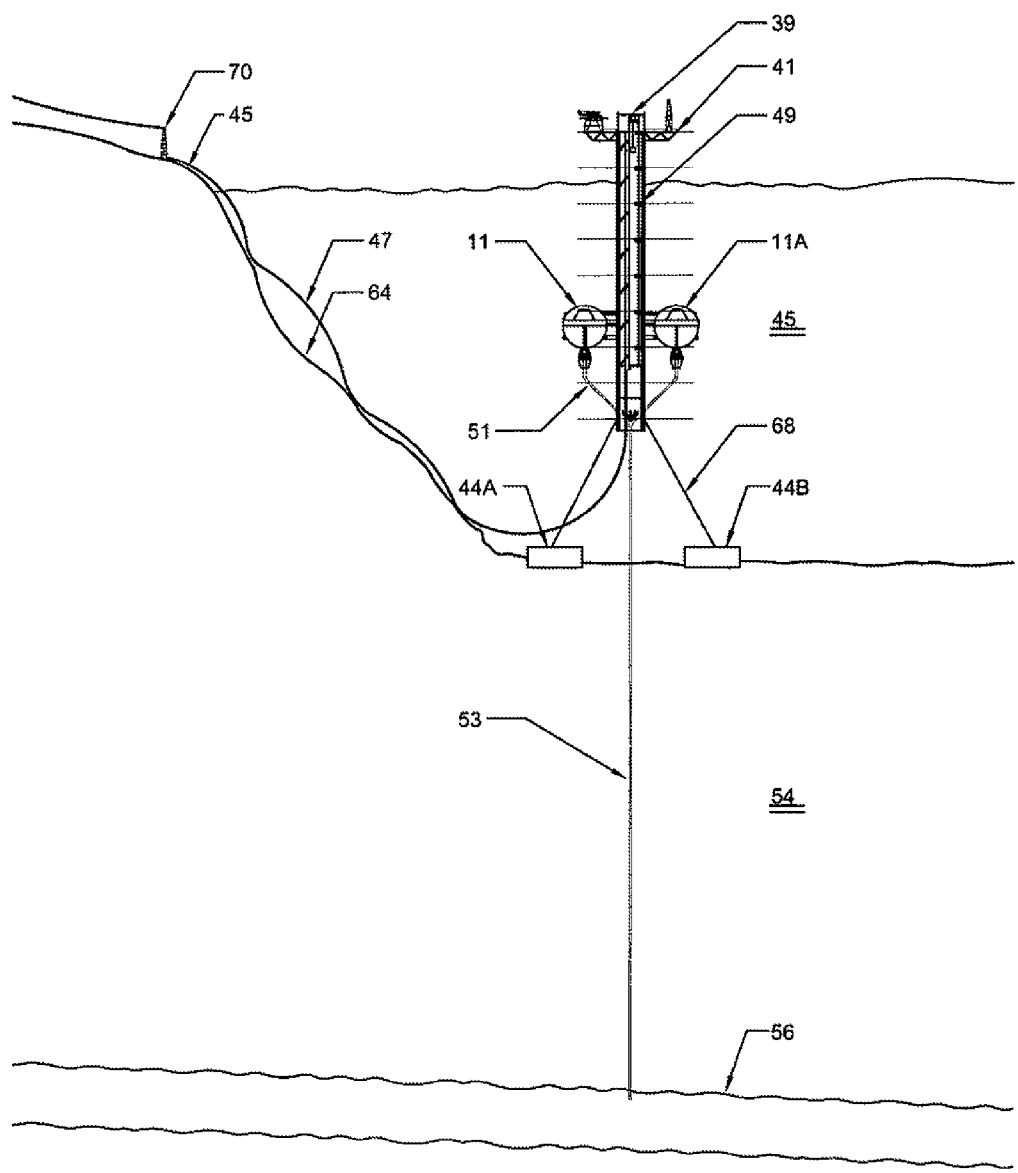

The view of FIG. 12 illustrates the location of a system positive pressure injection well extending to the saline aquifer or boulder zone near to a shoreline.

Figure 11:
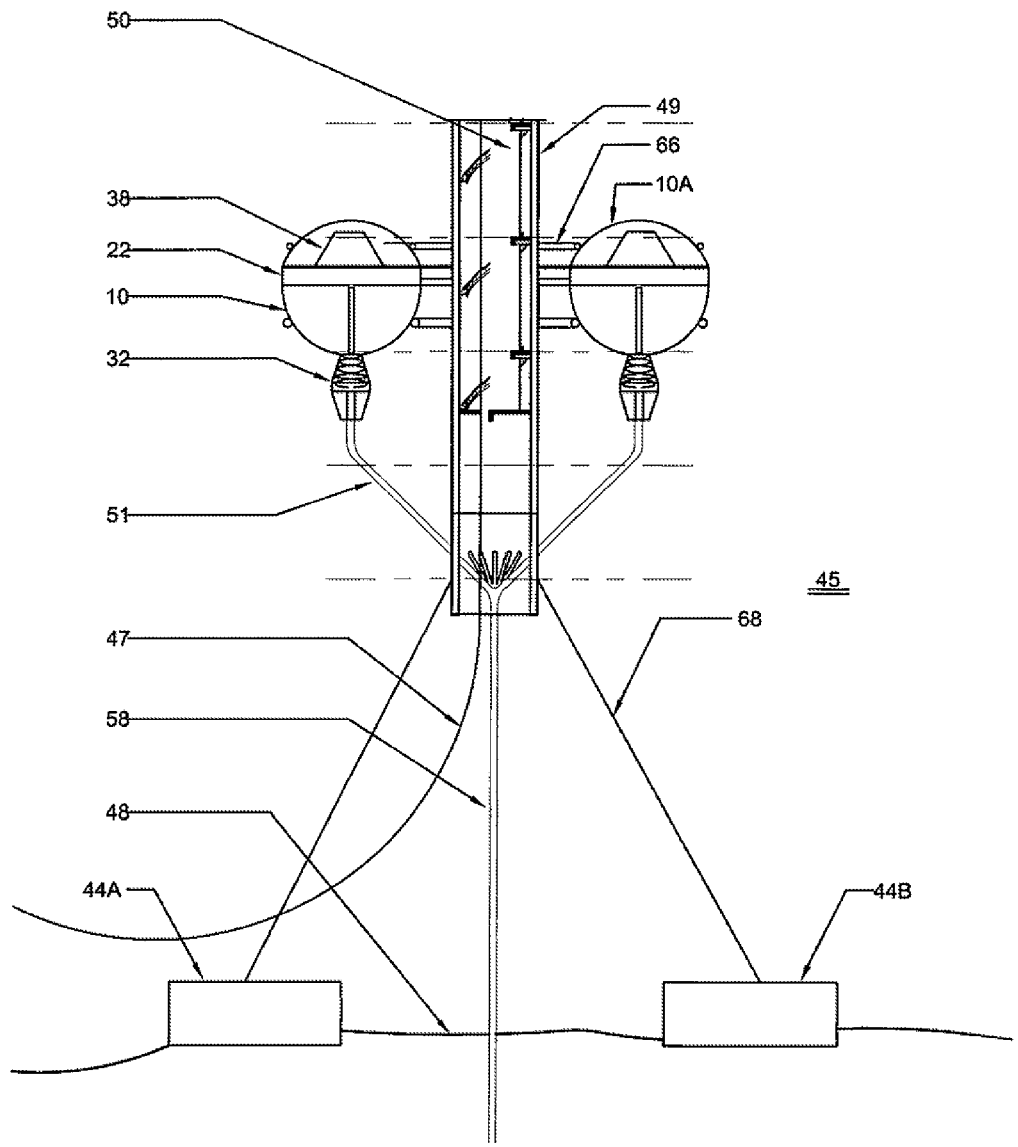
FIG. 11 is an enlarged view of an in-water suspension embodiment of the invention.
Figure 13:
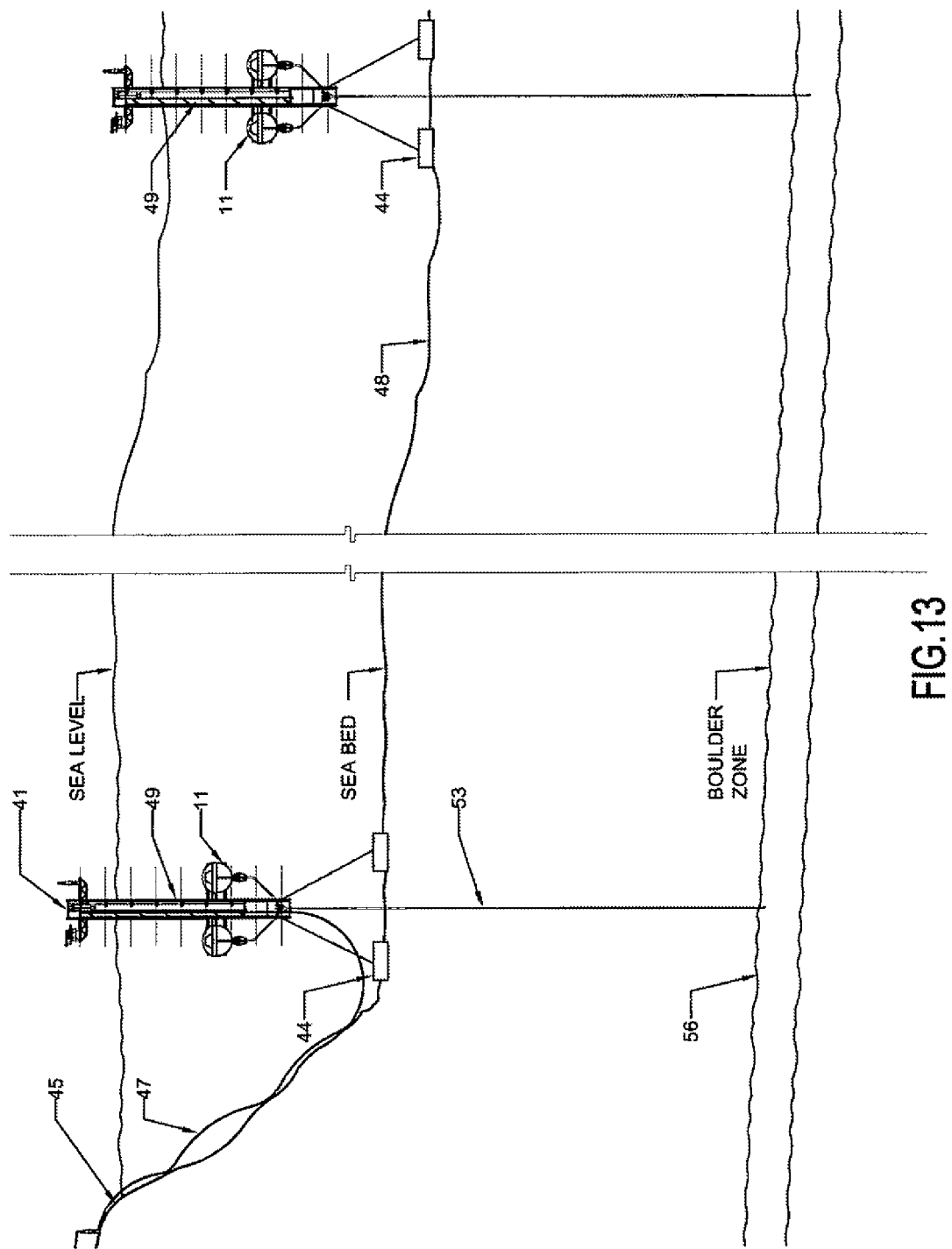

FIG. 13 is a view showing the embodiments of FIGS. 11-12 in combination with a second system further from the shoreline.

Figure 14:
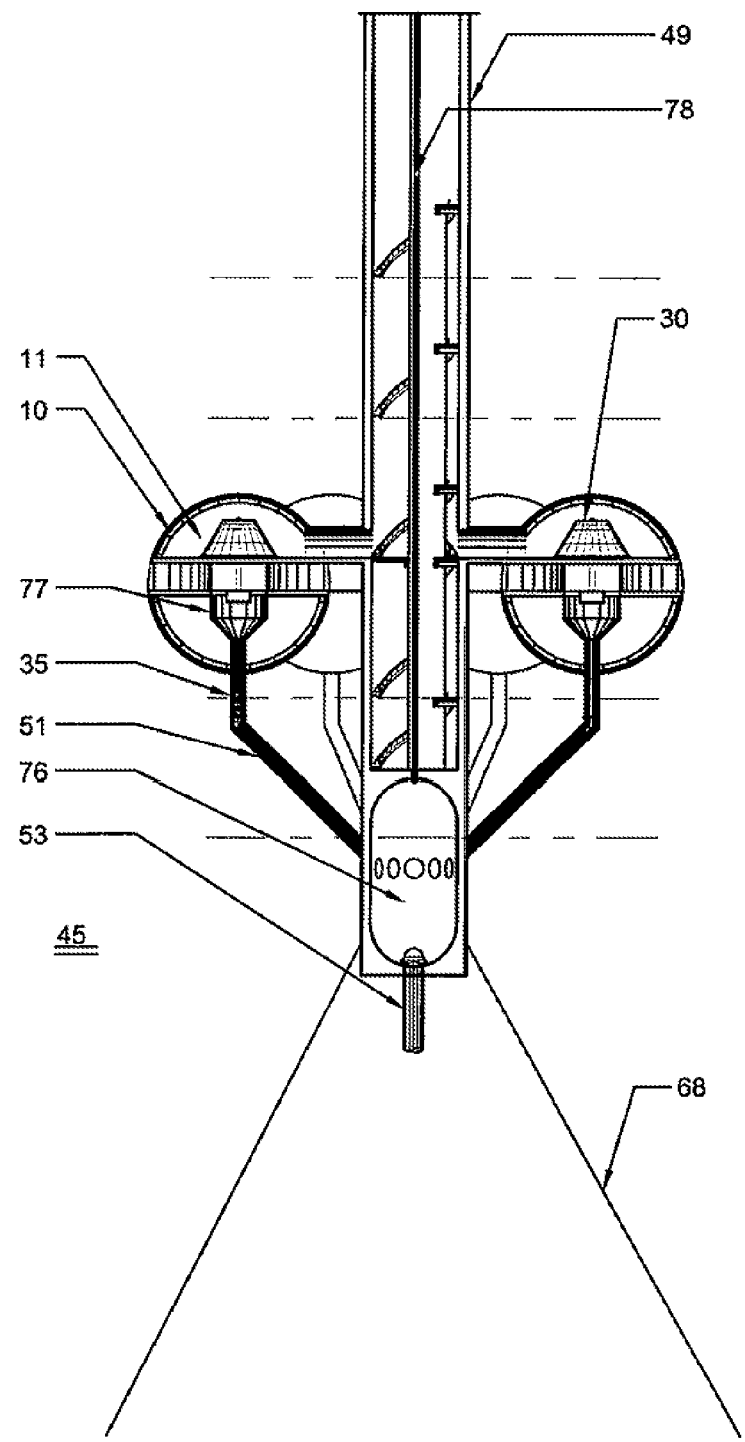

FIG. 14 illustrates a variation of the embodiment of FIGS. 12-13 including a high pressure air chamber preceding a at discharge line.

Figure 9:
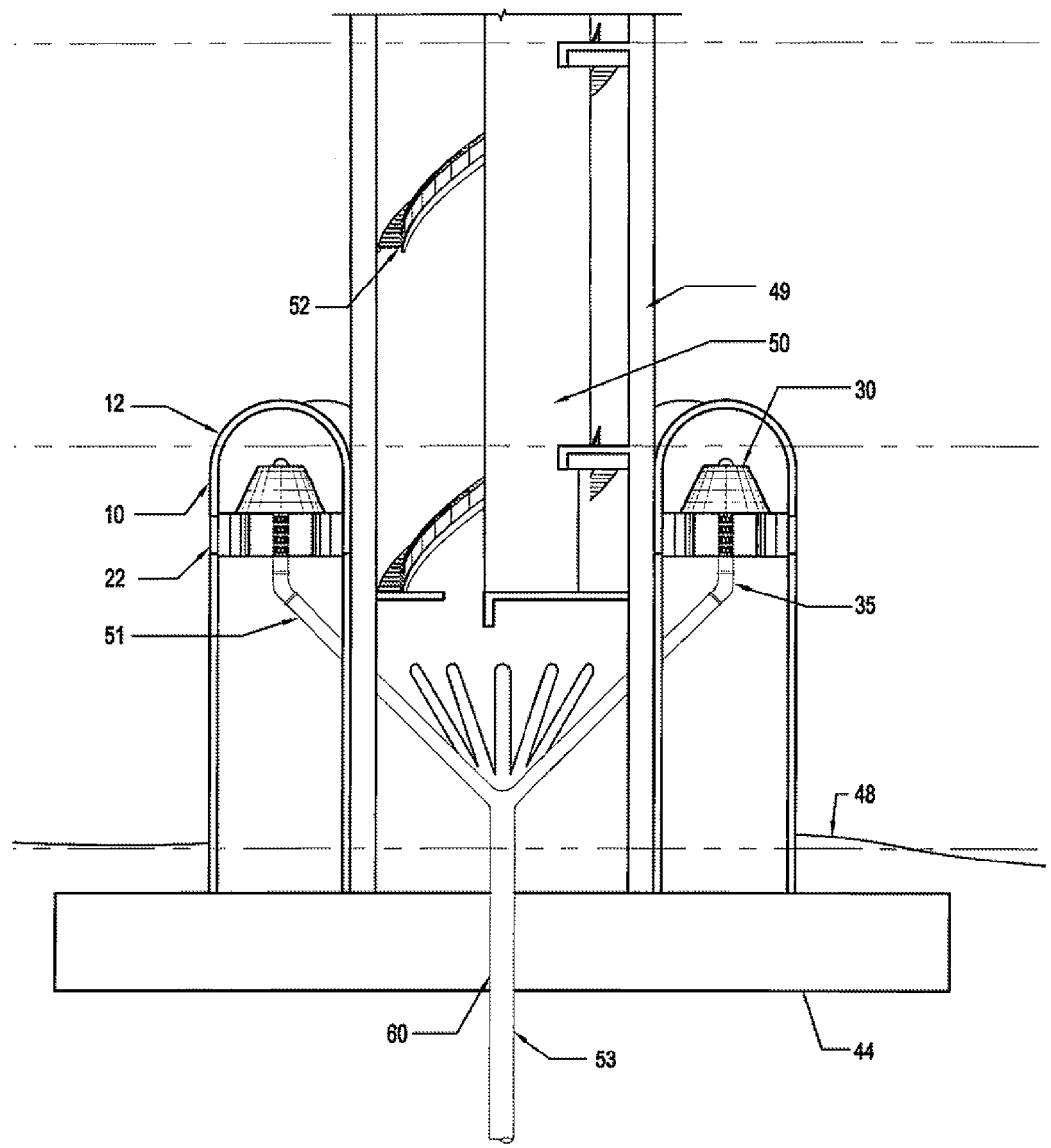
FIG. 9 is an enlargement of the lower portion of FIG. 7.
Figure 15:
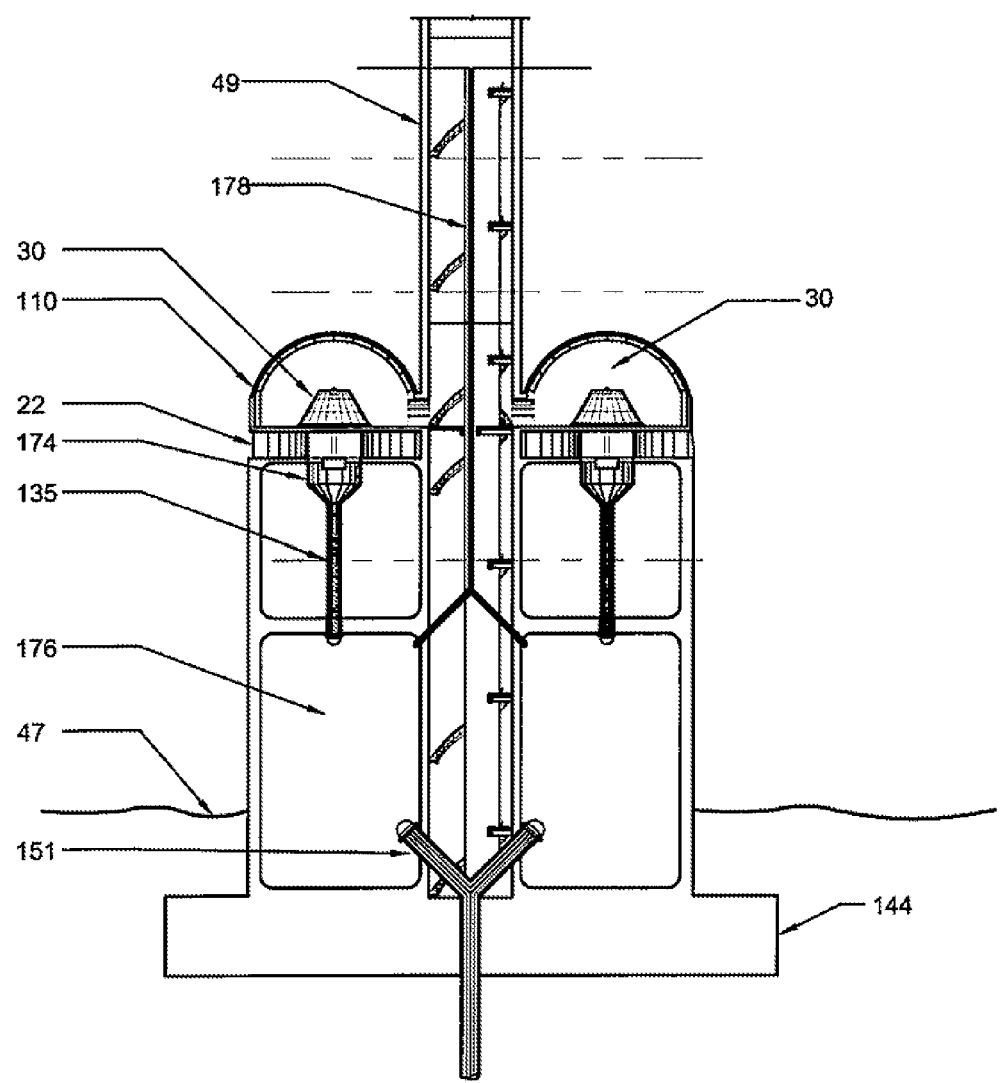

FIG. 15 shows a variant of the embodiment of FIG. 9 with the high pressure air chamber at a base of a gravity fed structure.

Figure 16:
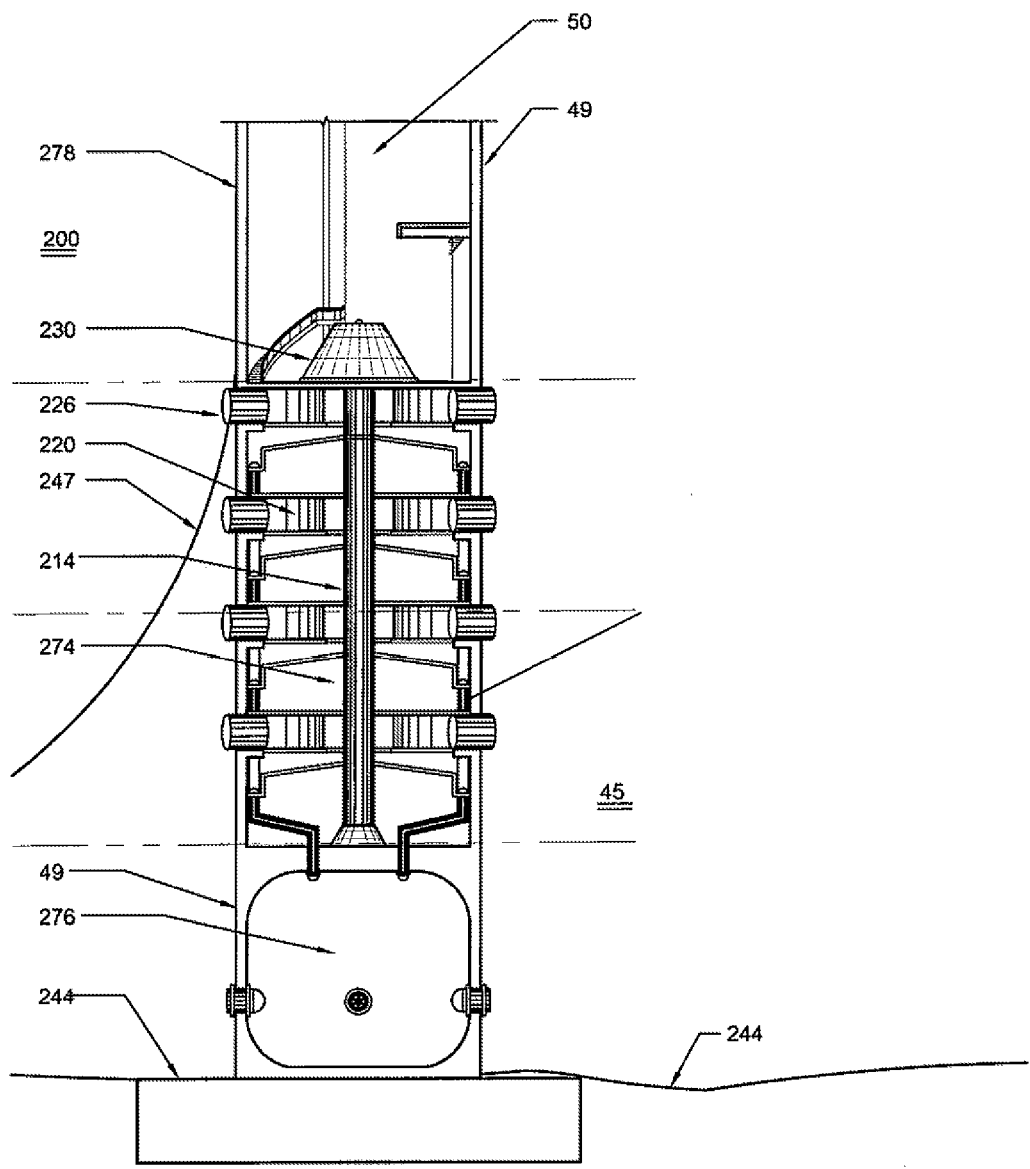

FIG. 16 shows a further embodiment having multiple turbines in series vertically shows a variant of the embodiment of FIG. 15.

Figure 17:
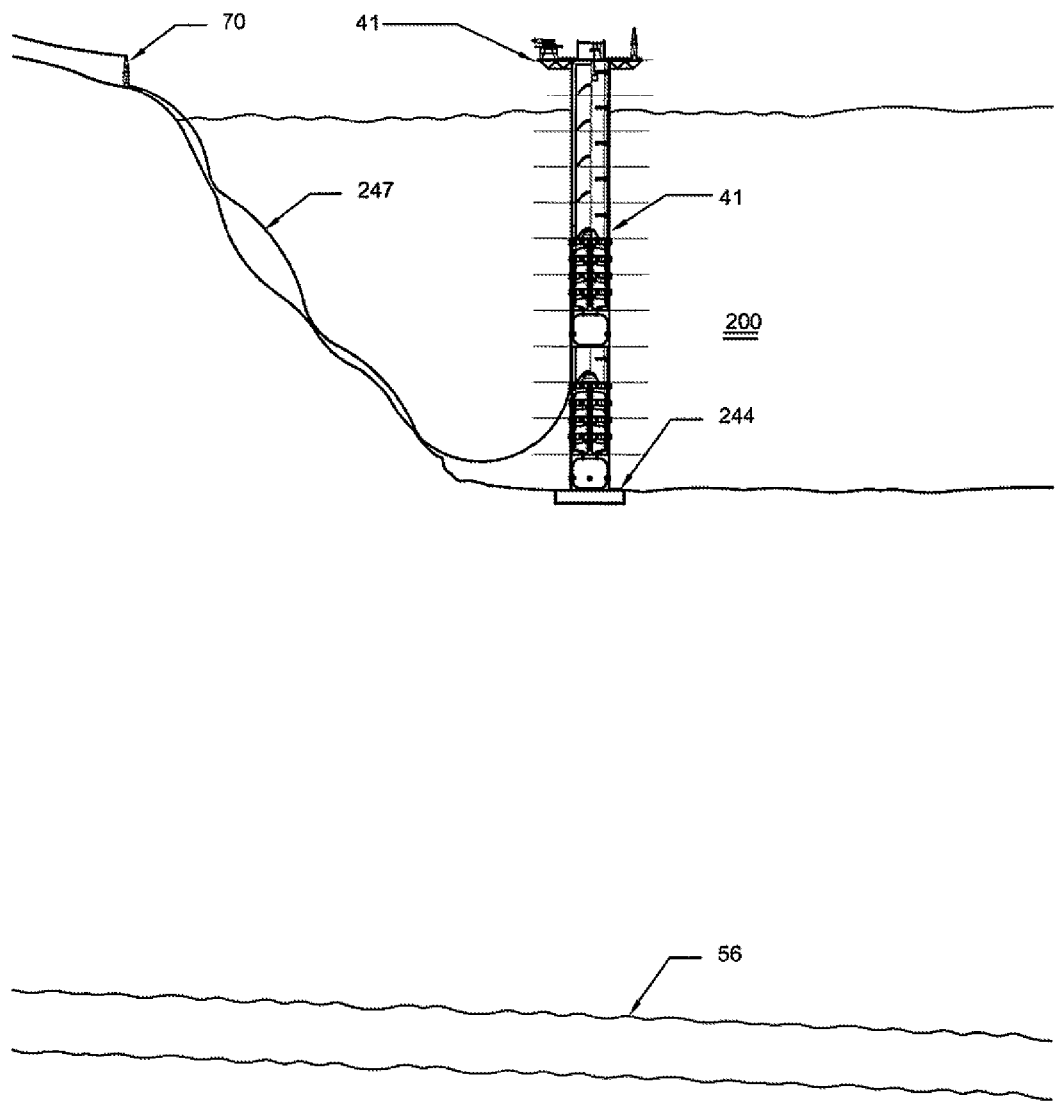

FIG. 17 shows an enlarged view of the veridical turbines with a high pressure chamber in a gravity fed base system of FIG. 16.

Figure 18:
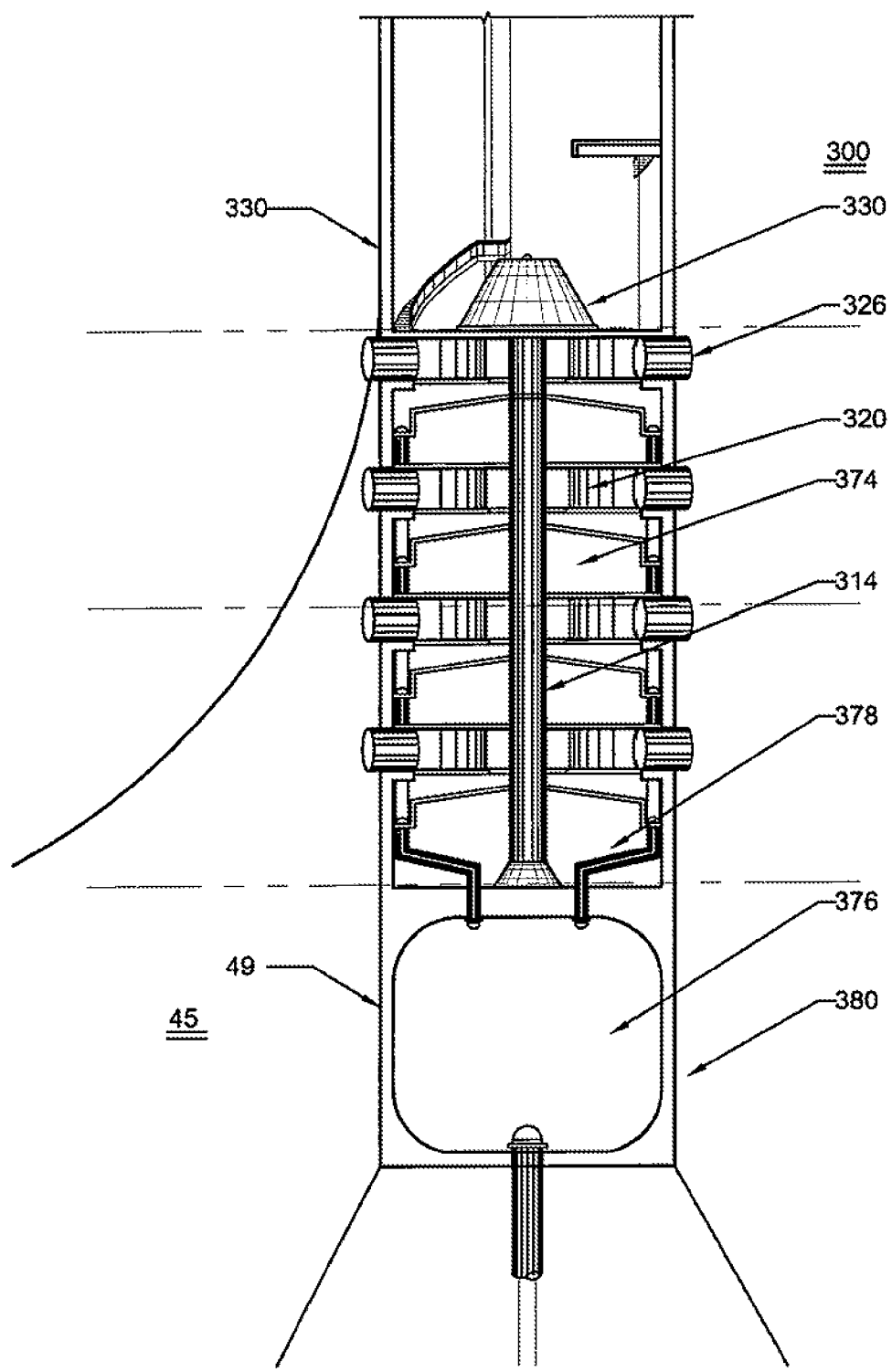

FIG. 18 shows a yet further embodiment in which the water output of a suspended system is expelled directly into the ocean near to the seabed with pumps in the discharge chamber.

Figure 19:
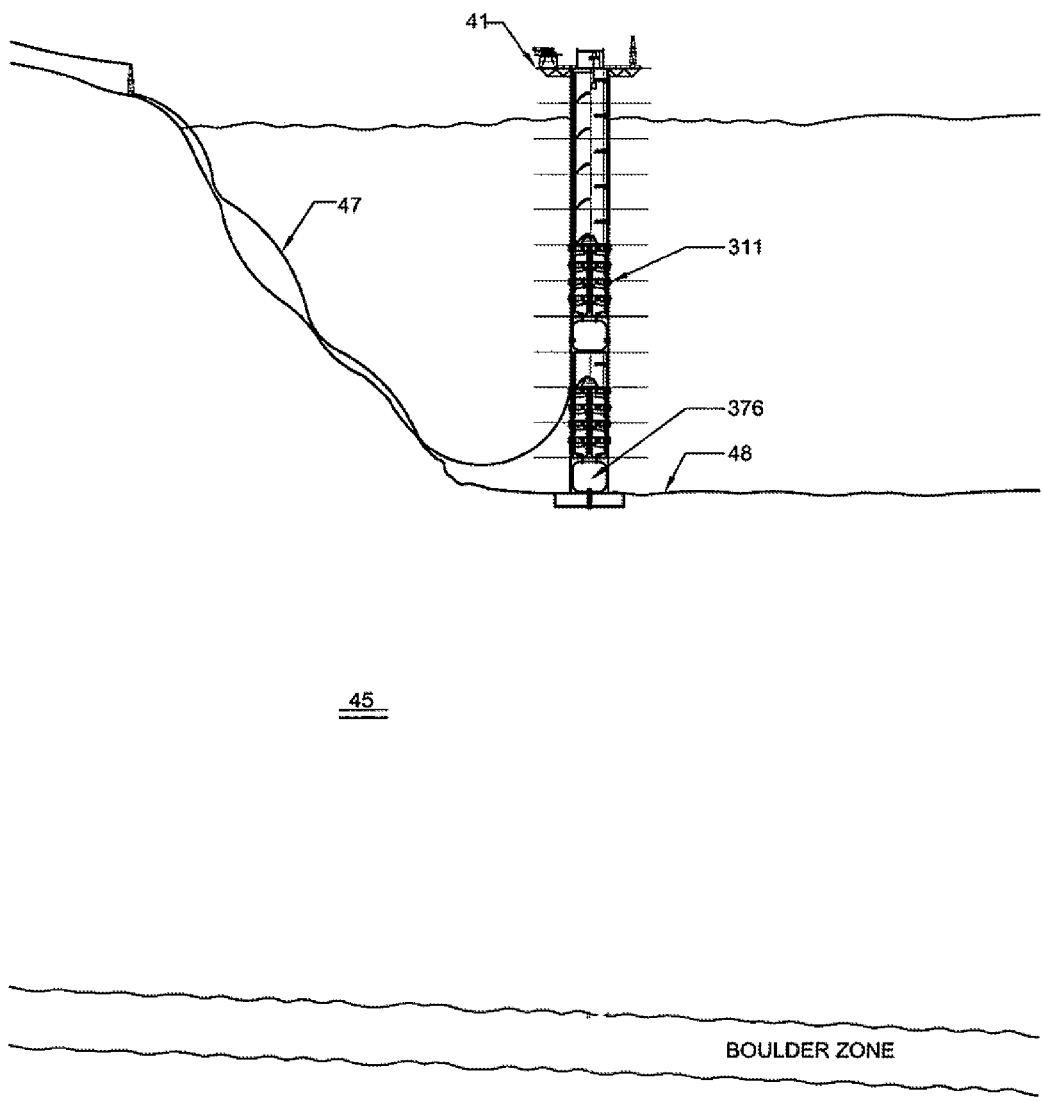
Figure 20:
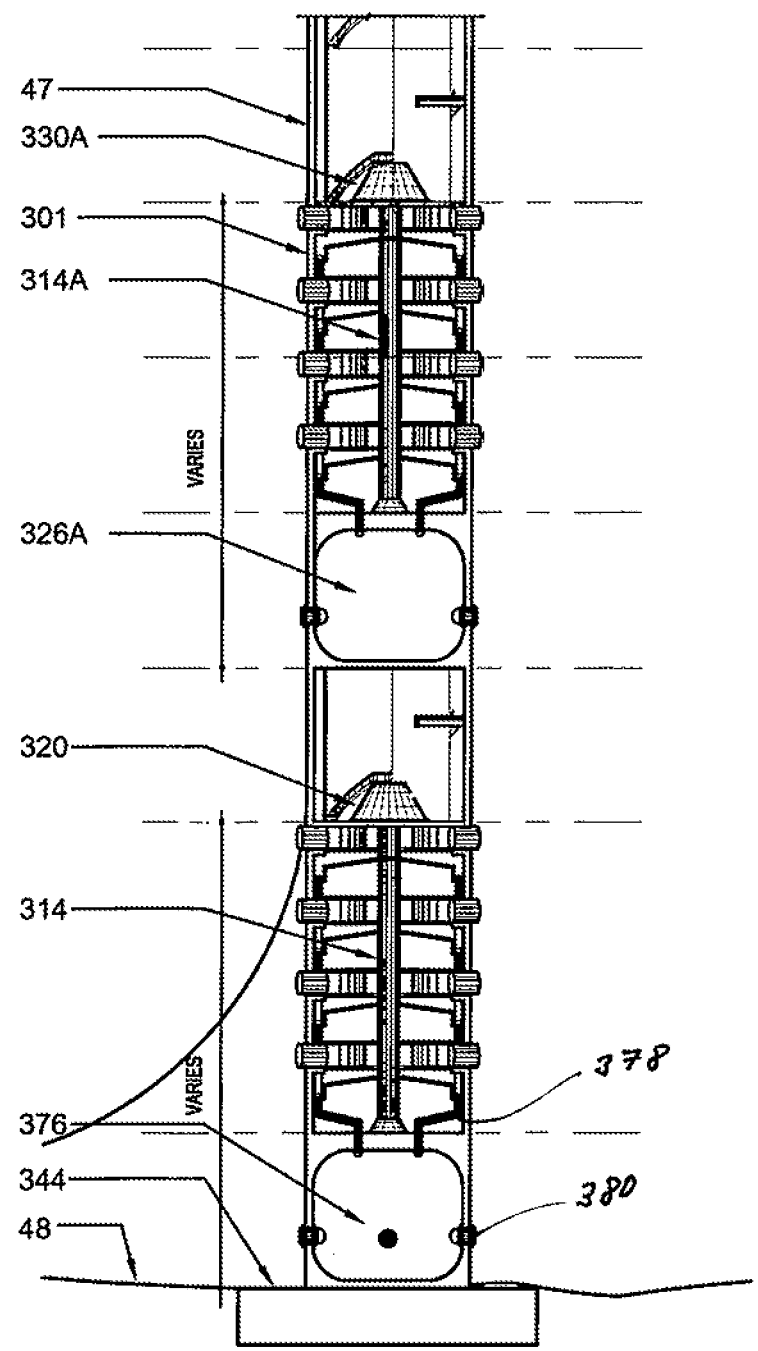

FIGS. 19 and 20 illustrate a variation of the embodiment of FIG. 18 with multiple turbines in clusters in vertical series in which the water output (discharge) of the system is expelled directly into the ocean of a gravity fed system.

Figure 21:
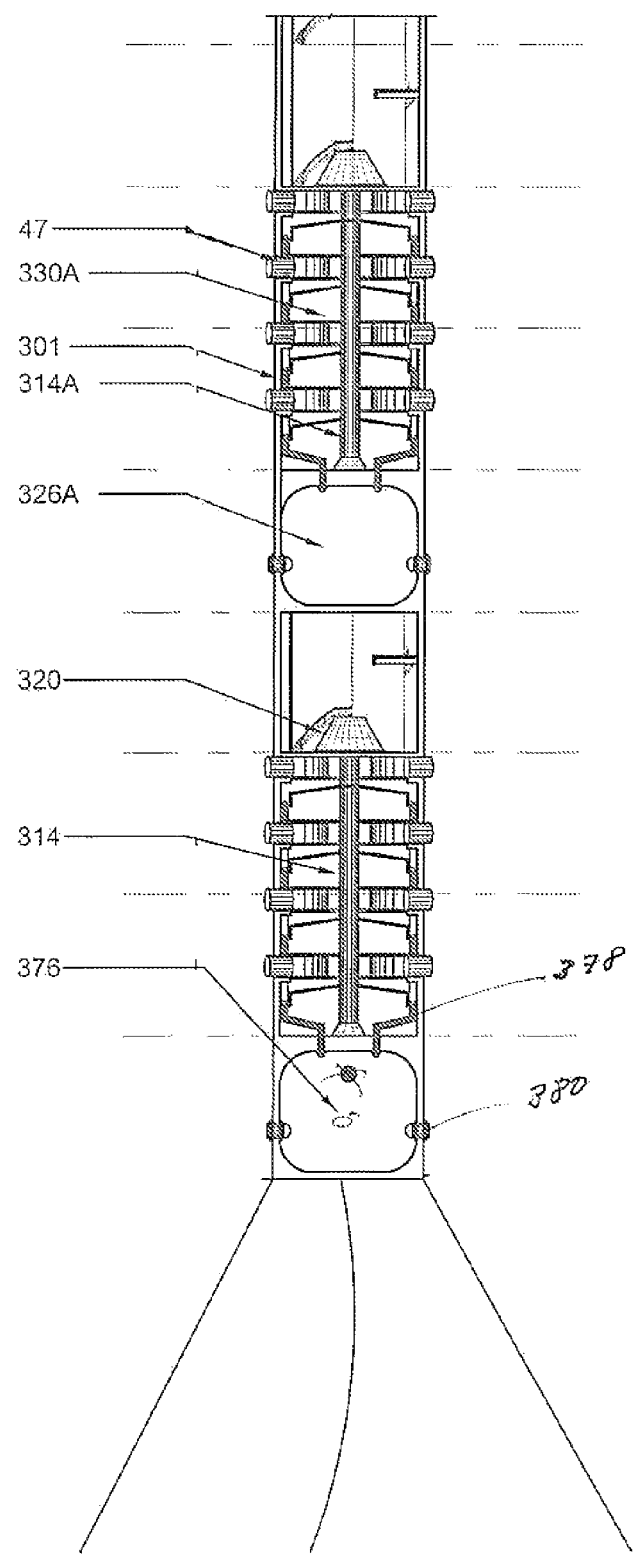

FIG. 21 illustrates a variation similar to the embodiments of FIGS. 19 and 20 with multiple turbines having a single generator in vertical series in which water output (discharge) of the system is expelled directly into the ocean or a suspended system.

DETAILED DESCRIPTION OF THE INVENTION

Figure 1:
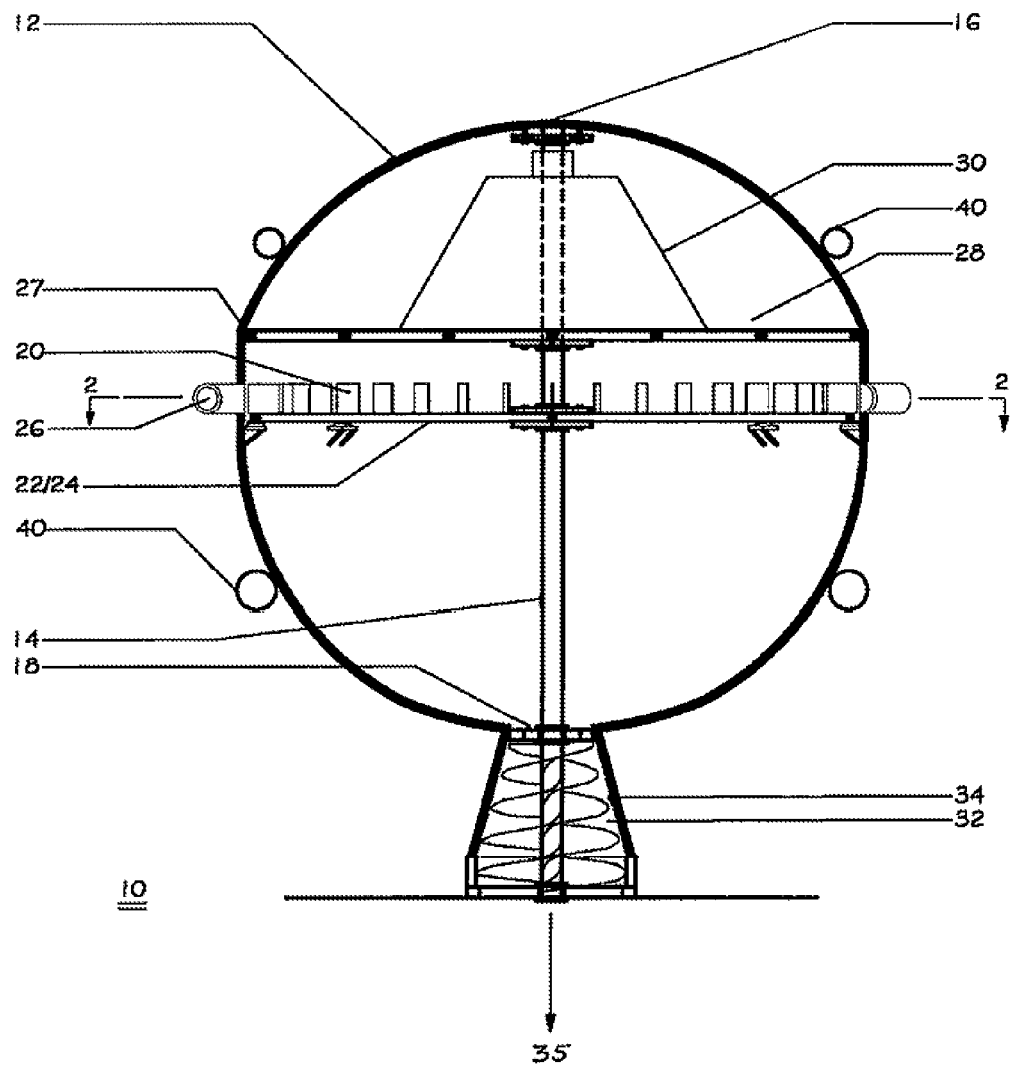
FIG. 1 is a vertical cross-sectional view of the inventive suspended/gravity fed deep water power generation system.

With reference to the vertical cross-sectional view of FIG. 1, the instant deep-water power generation system 10 may be seen to include an enclosure or sphere 12 which is initially evacuated of all air or water. The walls thereof are of suitable strength or reinforcement to maintain the structural integrity thereof at deep-water pressures as might be encountered at depths of deeper than 30 feet.

The invention is importantly characterized by a power axle 14 which extends through the entirety of the sphere from a north pole 16 thereof to below a south pole 18. These features may also be noted in FIGS. 3-6.

In the sphere are provided a multiplicity of preferably concave blades 20 which are elements of a turbine 22, preferably of the Kaplan, Francis or Pelton type, which is secured upon a support frame 24, which in turn is rigidly secured to said power axle 14 at a latitudinal plane of said sphere, for example, at a 15 degrees north latitudinal location. The turbine assembly may be more fully appreciated in the perspective views of FIGS. 3 and 4 in which the support frame 24 may also be seen. Therefrom it may be appreciated that support frame 24 consists of both radial and circumferential members.

Figure 2:
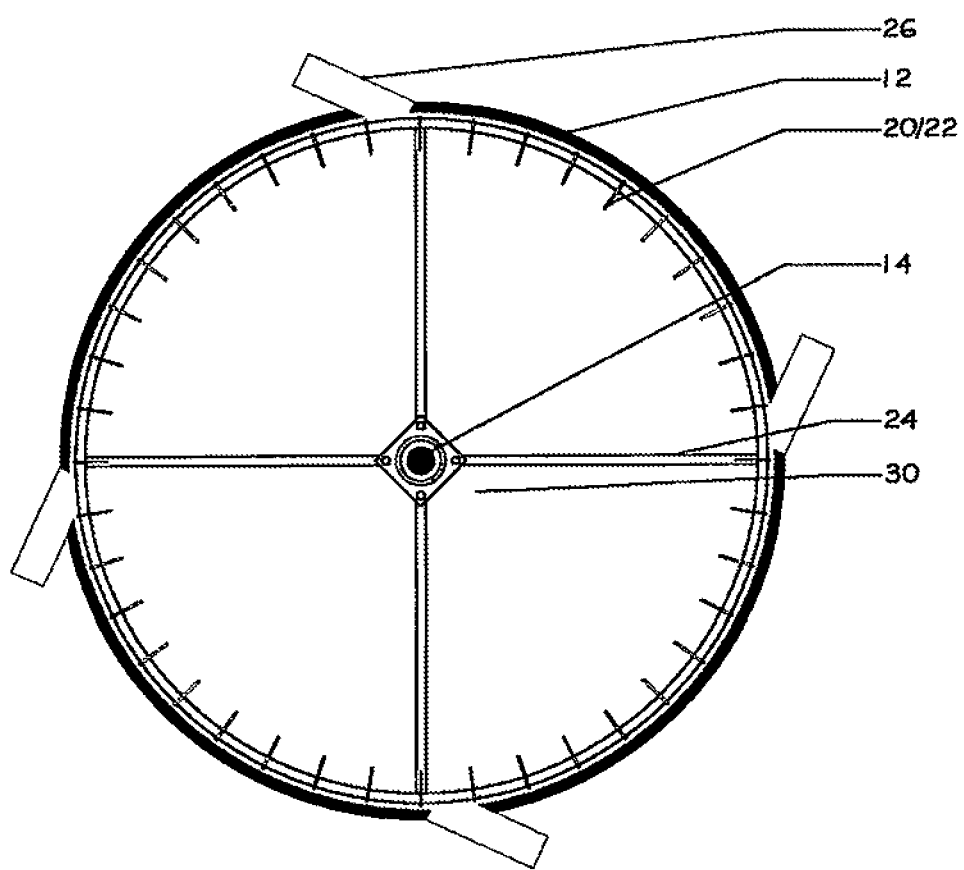
FIG. 2 is a horizontal cross-sectional view taken through Line 2-2 of FIG. 1
Figure 6:
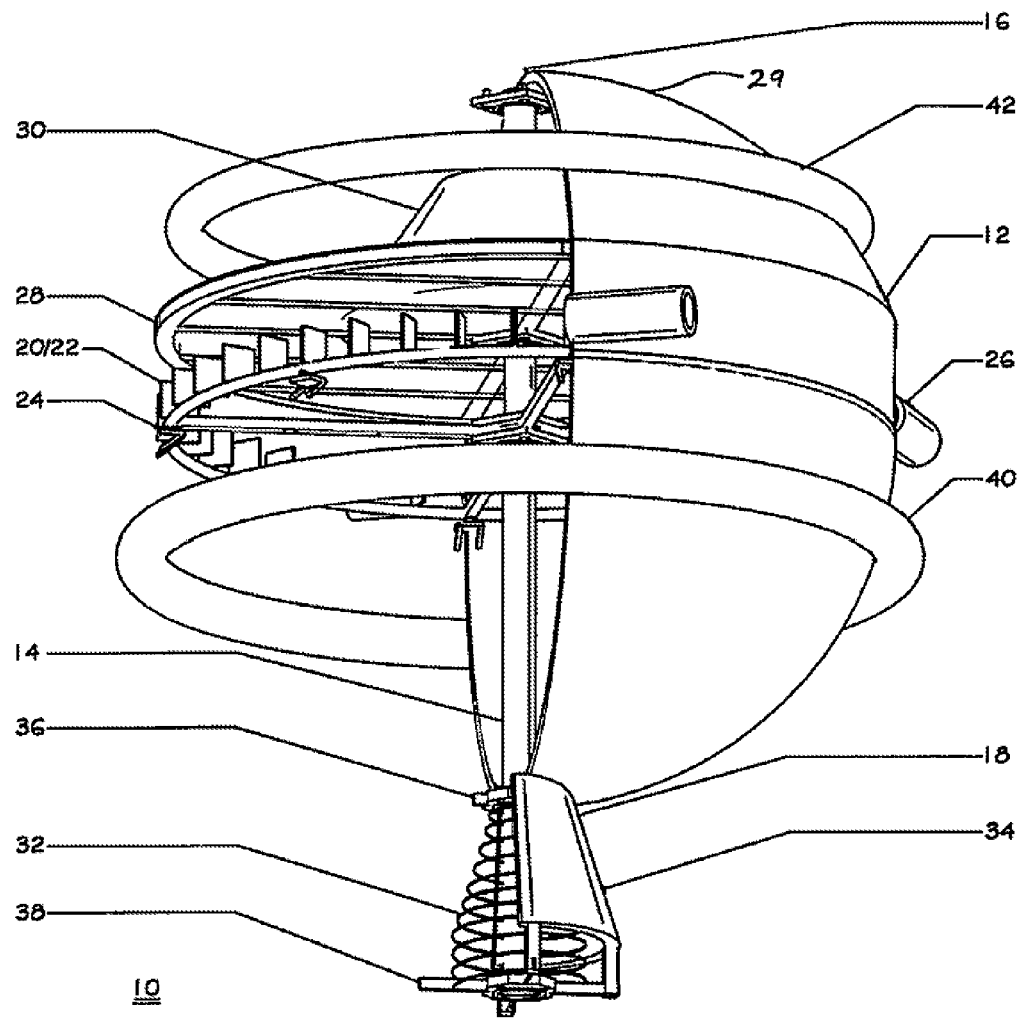
FIG. 6 is a 90-degree rotated view of FIG. 5 showing the positioning of the intake ducts relative to the turbine and blades thereof and also showing the screw auger and water output associated with the south pole of the sphere.

An inflow of ambient deep waters against concave blades on both the x and z axes (vertical and horizontal) 20 is accomplished through the use of a plurality of inlet ports 26 (see FIGS. 1, 2, and 6). From the views of FIGS. 2 and 6, it is to be noted that the axis of said inlet ports 26 is selected to define a direction of inflow of the ambient deep water against a central portion of each turbine blade 22, thereby maximizing the transfer of energy from the ambient deep water at depth which is directed against the turbine blades, inducing rotation of said blades, as well as their support frame 24 and power axle 14 to which the frame is rigidly connected. Such matched rotation originating at opposite sides of the turbine is known as a couple force effect in which the radii of the turbine at opposing pneumatic inflows act as lever arms to create a maximum impulsive force of rotation of the axle of the generator.

In a preferred embodiment, each inlet port 26 is provided with control valves (not shown) for regulating the volume and rate of admission of ambient water which, thereby, operates to control the rate of rotation of the blades of the turbine 22.

Shown in FIGS. 1, 3, 4 and 5 is a thrust deck 28 which is rigidly secured, internal to said enclosure, to said power axle 14 and turbine 22. It is noted that thrust deck 28 is rigidly secured to the interior of enclosure 12 at the circumference thereof, indicated at points 29 in FIGS. 1, 5 and 6. As such, the thrust deck is rigidly secured to the interior of the enclosure such that the exterior of generator 30 will not rotate as power axle 14 rotates the armatures (or equivalents thereof) of the generator. In all figures, the location of generator 30 between thrust deck 28 and north pole 16 of the enclosure may be seen. Therefrom and particularly at an outlet positioned at or near north pole 16 is the output of electricity generated by generator 30 that then may be transferred, via cable 47 (see FIG. 12), to a transmission station 70.

The system also includes a barge 41 floating above the surface 43 of a body of water 45 within which the enclosure is immersed. Said barge is more fully described below.

Stability of the enclosure at a desired depth is assured through the use of at least one ballast ring 40 (see FIGS. 1, 5 and 6) and at least one buoyancy ring 42. In equilibrium, ballast will equal buoyancy. With said rings 40/42, the lowering elevation or stabilization of the enclosure at a given depth may be assured. However, to provide enhanced stability, an external anchor 44 of substantial mass may be provided to counter torque or reactive forces associated with the inflow of ambient water to inlet ports 26. See FIGS. 7 and 8. A similar objective may be achieved through the use of a special-purpose base 46 to which one or more enclosures 12 may be secured, upon the seabed 48. See FIG. 8.

Figure 3:
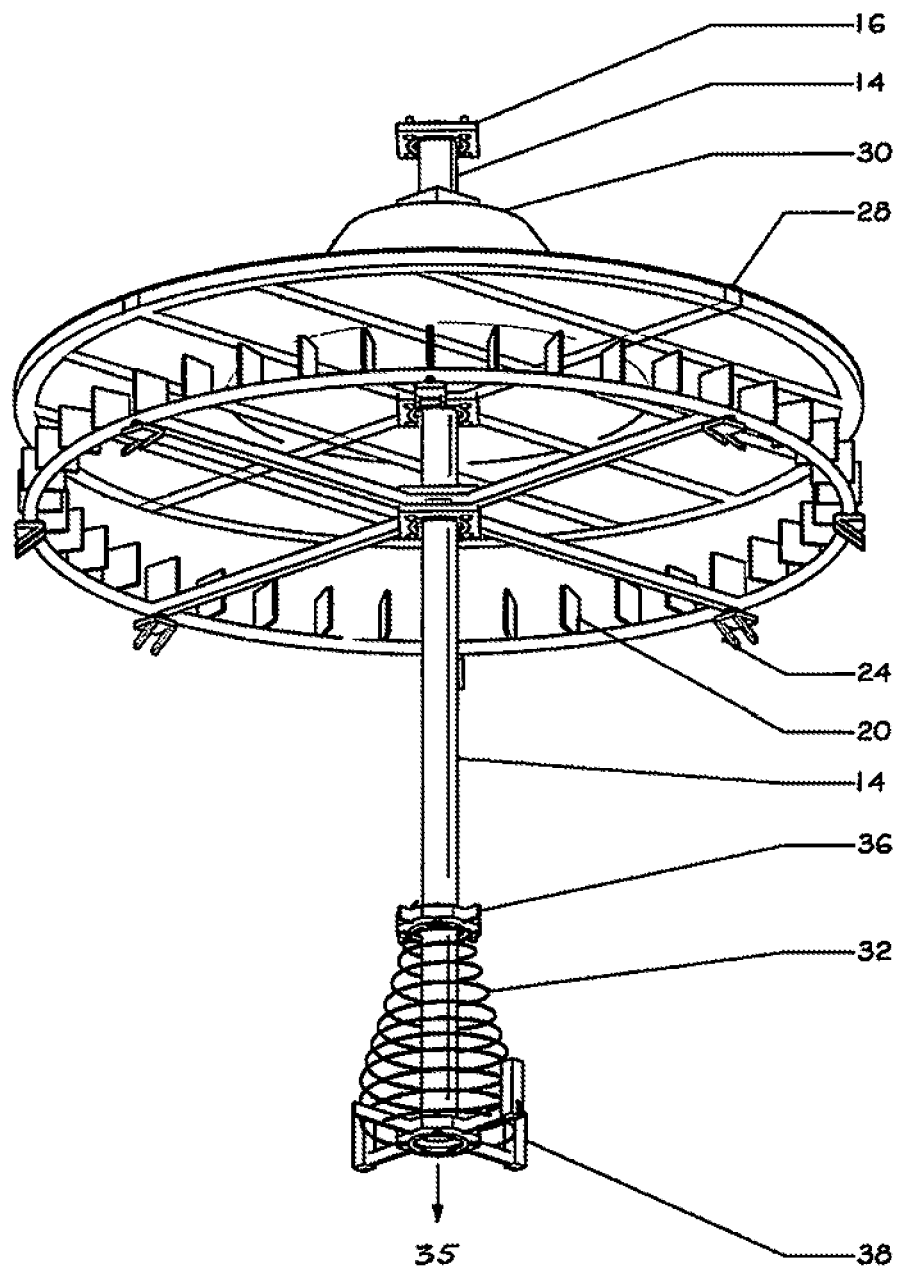
FIG. 3 is a conceptual view showing the elements of the inventive system internal to the sphere thereof.
Figure 4:
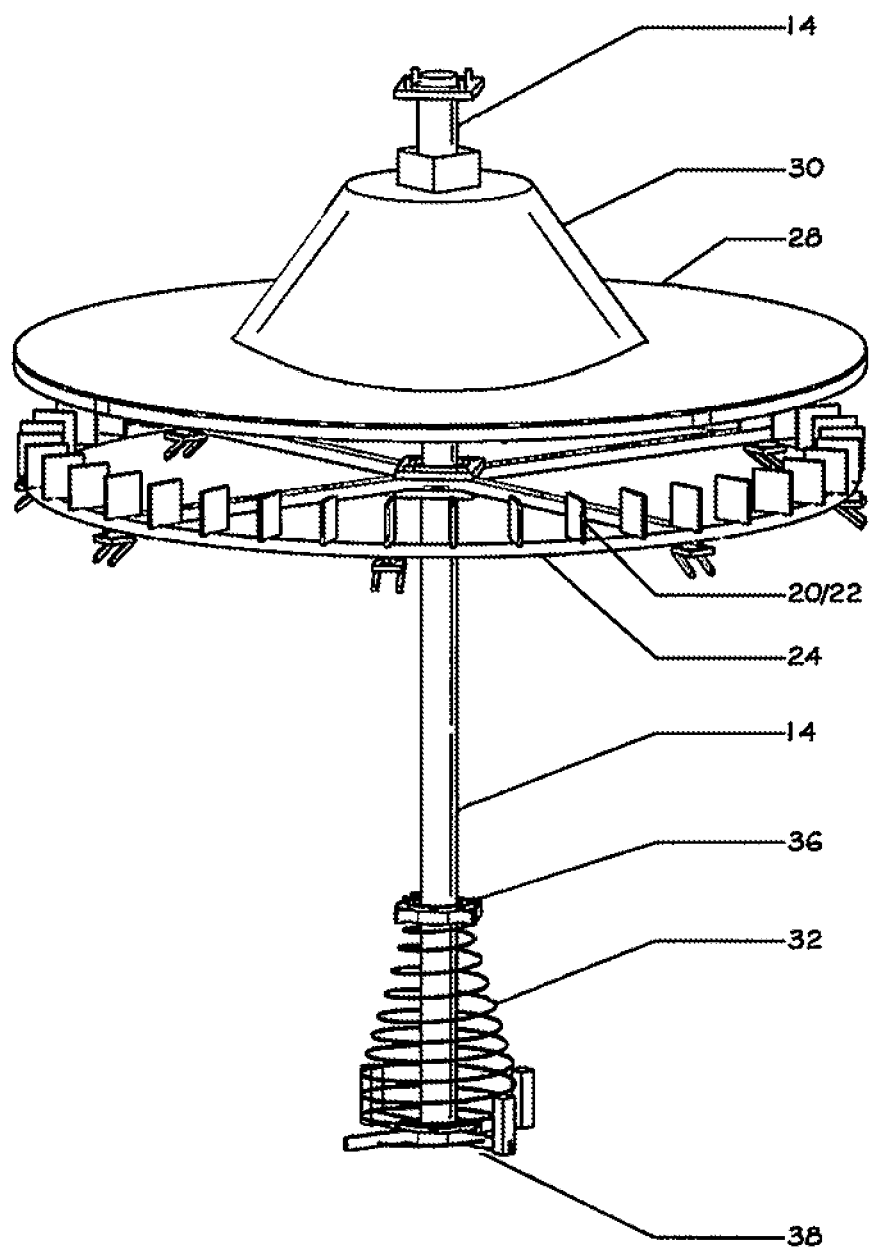
FIG. 4 is a side perspective view of the elements of the invention shown in FIG. 3.

The efficient evacuation of ambient deep water entering the enclosure through ports 26 may be effectuated through the use of an inverted partial conical segment 34 in the nature of a shroud which maximizes the rate of rotation of the shroud while minimizing cavitation or other unwanted vibration of water as it is expelled downwardly in direction 35. See FIG. 5. As may be appreciated, the rate of ejection of water from the enclosure must be substantially equal or greater than the rate of admission of water to the enclosure through the inlet ports 26 to maximize internal stability and operation of the system. Further details of the auger and shroud structure are shown in FIGS. 3 and 4 where propellers 36 and 38 may be seen. As such, the integrated action of auger 32, shroud 34, propeller 36 and propeller 38 will, as one selection, result in an efficient ejection of water from the south pole of the enclosure in direction 35.

Figure 5:
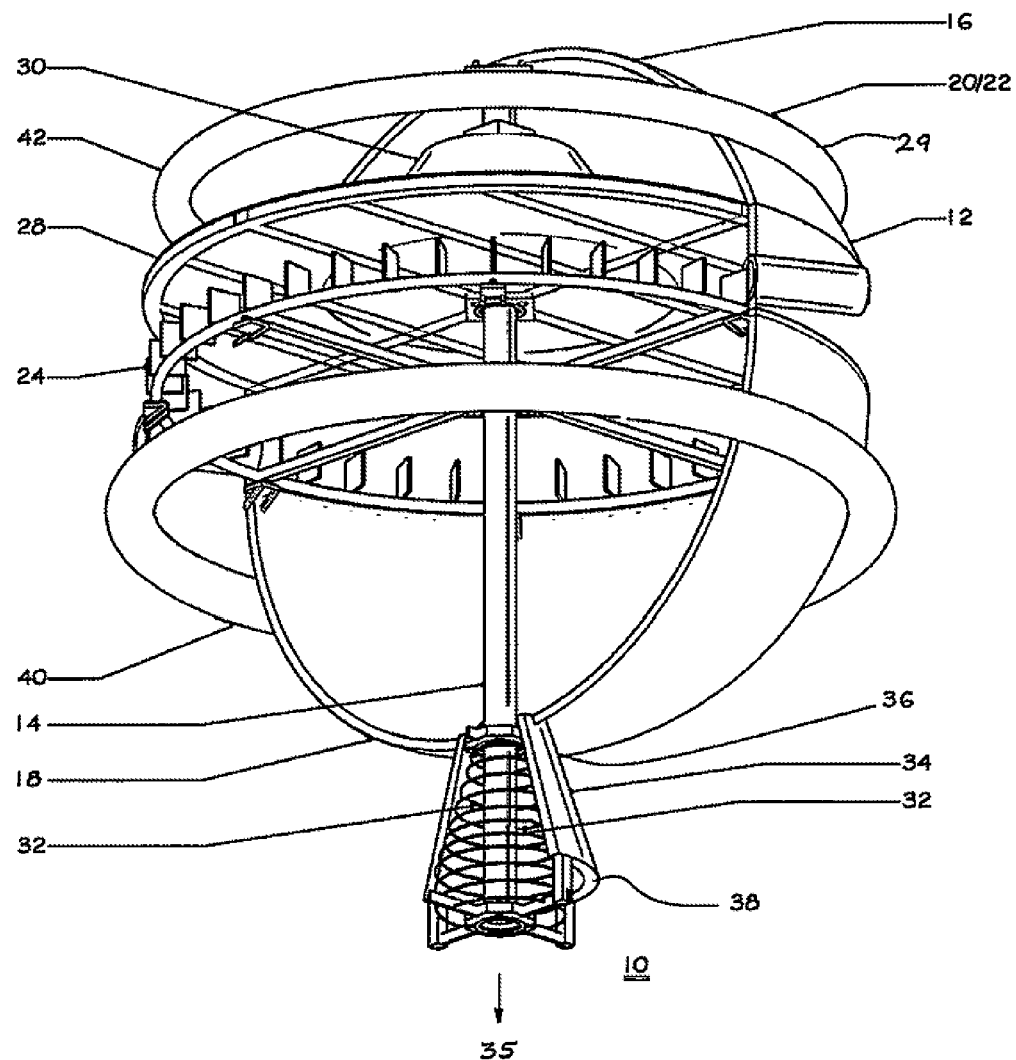
FIG. 5 is an elevated break-away perspective view of the entire system showing the relationship between the turbine and generator located within the sphere as well as the relationship of buoyancy and ballast rings which are secured upon the system sphere.

The above described structure is shown in perspective breakaway view in FIGS. 5 and 6. Therefrom it may be noted that shroud 34 may possess a hollow cylindrical geometry 37 as opposed to that of the inverted partial cone 34 which is shown in FIG. 1

Figure 7:
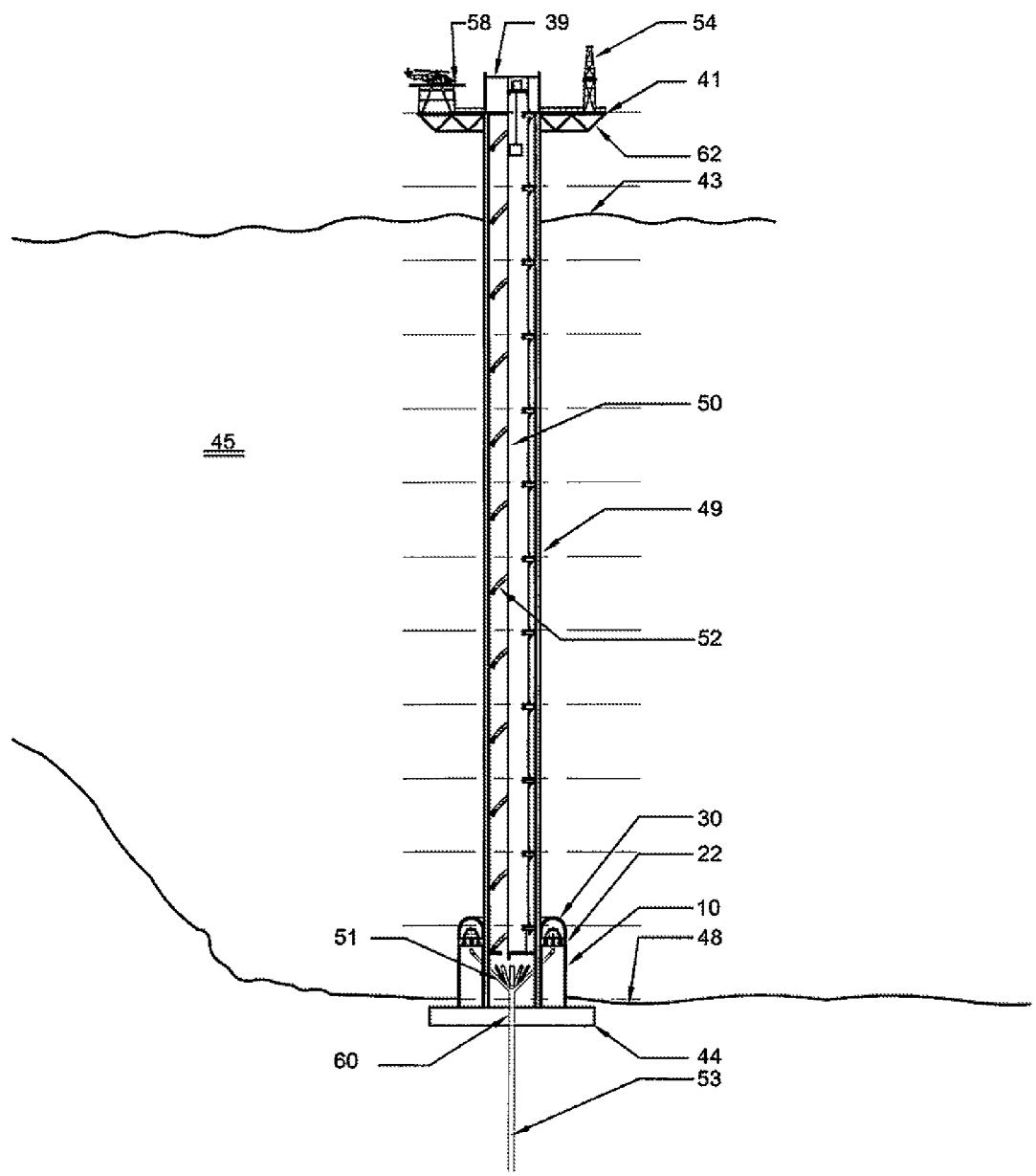
FIG. 7 is a schematic view of deep water gravity fed system showing a multiple generator system secured to a seabed and extending to an above water surface working platform.

With reference to FIG. 7, there is shown a vertical cross-sectional schematic view of multiple deep water power generation systems 12 of the types above-described. However, in such a multi-unit generating system, outputs 35 of each are funneled through a network of diagonal conduits 51 and therefrom into a substantially vertical positive pressure injection well pipe 53 which passes through a well head 60 embedded within a massive anchor 44 formed of concrete or the like. As may be noted, anchor 44, as well as well head 60, is located slightly beneath the level of seabed 48.

Figure 8:
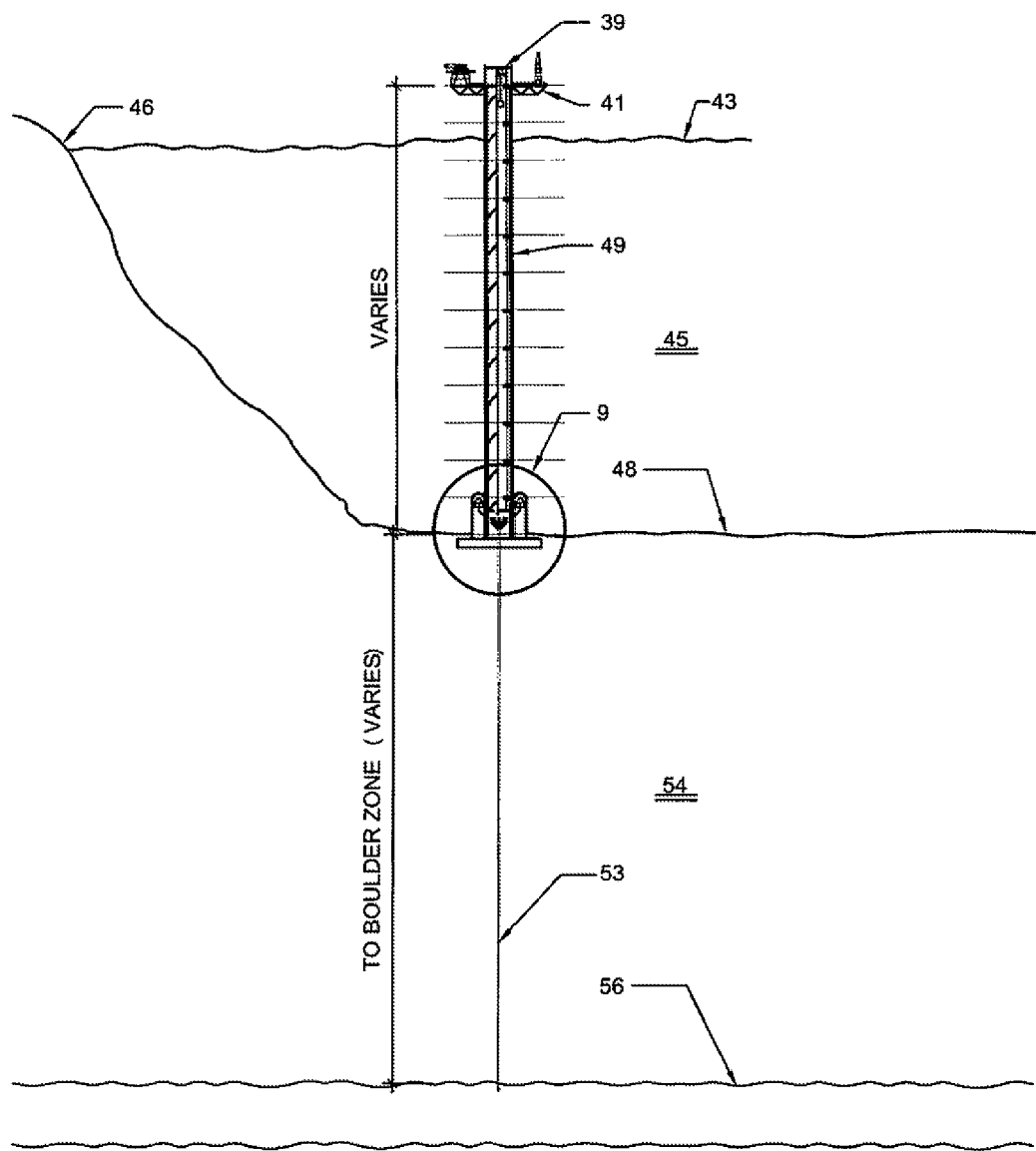
FIG. 8 is a view similar to FIG. 7, but showing the high positive pressure injection well extending to the saline aquifer or boulder zone.

Projecting upward from system anchor 44 is platform column 49 as well as each of the individual generating systems 10. Within platform column 49 may be seen elevator shaft 50 as well as service stairs 52. A larger view of the entire system of FIG. 7 is a part is shown in FIG. 8 which indicates a depth between surface 43 of ocean 45 at which the generator complex is located. This depth is typically in a range of about 300 to 1600 feet. About 30 to 40 feet above sea level may be seen platform 41, a power control room 39, including transformers, located at a top of platform column 49 upon platform 41. Also provided thereupon is a communication tower 54 as well as a heliport 58. A support structure 62 for platform 41 is also shown in FIG. 8.

In FIG. 9 is shown an embodiment of the present invention in which the system of FIG. 8 is shown located just beyond continental shelf 64, or comparable geology, such that the system of FIG. 8 may be located at a sufficient depth below ocean level 43 and sufficient distance from ocean surface 43. Also shown in FIG. 9 is said high pressure injection shaft 53 which, in substantial alignment with the gravity vector, extends to the depth of a saline aquifer 56 which typically occurs within a geological layer known as a boulder zone. The depths of boulder zones may vary and, on occasion, certain geological formations include multiple boulder zones. A typical range of depth at which boulder zones and therefore saline aquifers are found falls in a range of about 2000 to 7000 feet beneath seabed 48.

Figure 10:
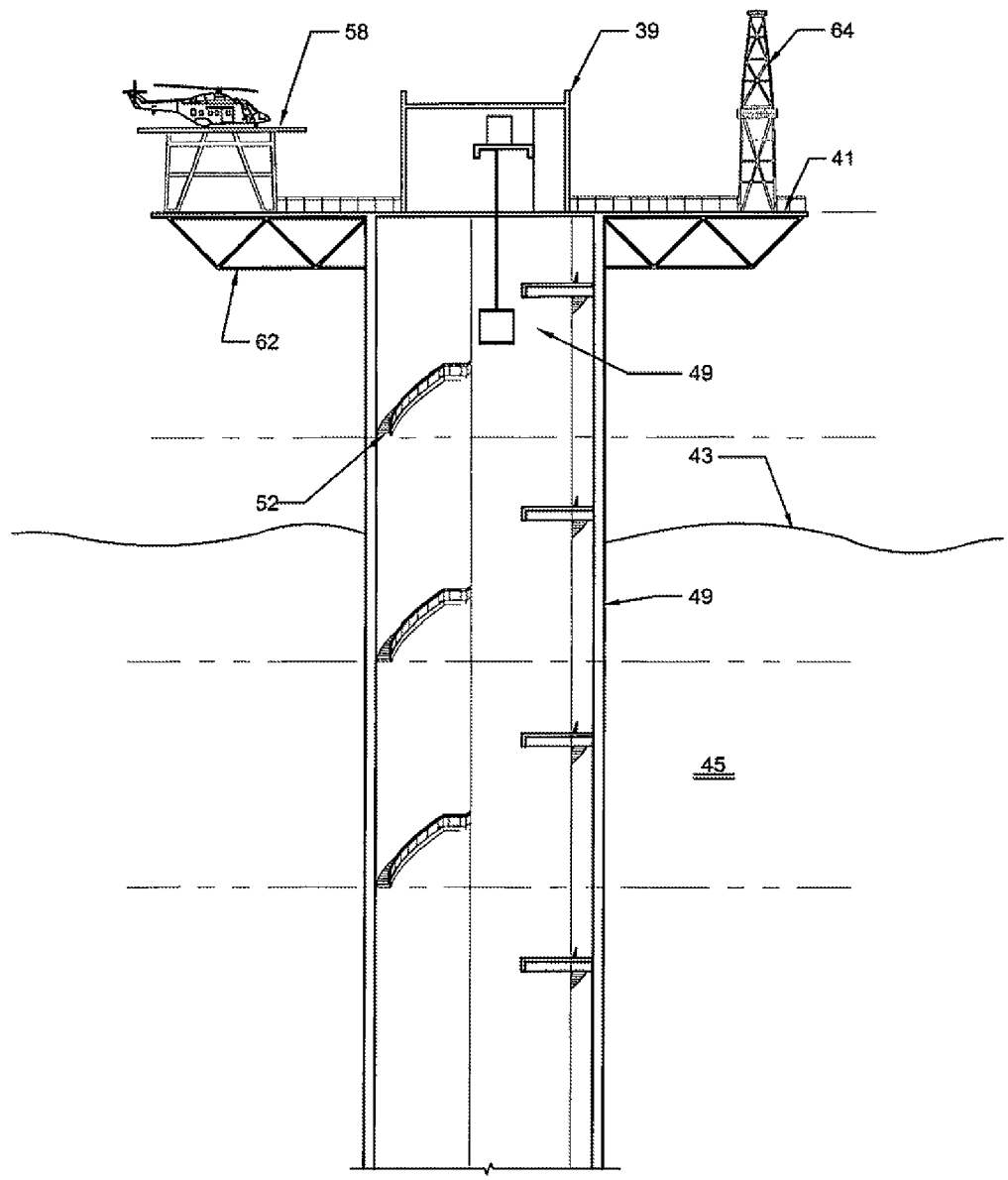
FIG. 10 is an enlargement of the upper portion of FIG. 7.

Shown in FIG. 10 is an enlarged view of platform 41 and its related components, as above described. It is noted that said platform may be enlarged sufficiently to provide for working, sleeping and living quarters of personnel who are stationed there for operation and servicing of surface and deep water aspects of the system. The contemplated output of a six-generator system is in the range of 55 to 60 megawatts/hour.

In FIG. 11 is shown a further embodiment of the present invention in which respective generating systems 10 and 10A, while secured to platform column 49 by rigid radial means 66, are suspended above seabed 48 through the use of tie-down cables 68 which also secure platform column 49 to anchors 44A and 44B located circumferentially about injection shaft 53 and upon seabed 48. Also noted in FIG. 11 is transmission cable 47 by which the outputs of electrical generators 30 may reach shoreline 46 to a transmission tower 70 and therefrom to a nearby power grid 72. See also FIG. 12 which shows the entire system inclusive of the saline aquifer 56 within geological structures 54 below seabed 48. It is anticipated that high pressure injection shaft 53 will have a maximum diameter of 24 inches and will operate in the range of 150 psi.

In FIG. 13 one may see a system of the type of FIG. 12 in which one part is used nearer to shoreline 46 while a similar sub-system may be employed at a greater distance from shoreline 46 in which applicable cables 47 would simply extend for a greater distance from the shoreline. The distribution of electricity through the use of cables upon a seabed is well-known particularly in islands of the Caribbean in which cables are used by certain islands, such as Exuma, The Bahamas, to import electricity from the mainland of North or South America or from larger islands.

The anticipated fluid discharge capacity of each generator models 10 is in the range of 45 million gallons per day which, in a six-turbine system, would yield a total salt water discharge of 270 million gallons per day. It is to be appreciated that multiple well-heads 60 in the range of 3 to 6 per system may be required in a given application. Further, to assure efficiency of transfer of turbine system output 35 through diagonal pipe network 51, the use of pumps in a range of horsepower per turbine of 300, for a total of 1,800 horsepower per cluster of six is anticipated, this however representing only a small fraction of the power generation capacity of the entire system.

In FIG. 14 is shown a variation of the embodiment of FIGS. 11-13 in which all diagonal pipes 51 depend from a pressure chamber 74 having a pressure substantially equal to the hydro-static pressure of ocean 45. Discharged water 35 proceeds to diagonal pipes 51 and into an air pressurized water discharge chamber pressurized high pressure supply 76 provided by high air pressure input 78, such as 150 psi, to facilitate flow injection to shaft 53 and therefrom to the well head (not shown) and to the saline aquifer. This scheme operates to equalize discharge pressure throughout the system, thereby reducing the possibility of a rupture at the well head.

In FIG. 15 is shown a version of the embodiment of FIG. 14, also generally corresponding to the embodiment of FIGS. 7-8, described above. Therein, a massive anchor 144 supports separate air pressurized water discharge chambers 176 for each generator model 110, and pressure is maintained within each hemisphere 111 above generators 30. Diagonal pipes 151 are also integrated into chambers 176, and a high pressure air input 178 operates to pressurize chambers 176 above that of the pressure in chamber 174.

The capacity of saline aquifers to absorb volumes in the above range of about 270 million gallons per day has been confirmed in various studies.

With regard to FIGS. 16 and 17, there is shown a further embodiment 200 of the present system in which, provided upon a foundation 244, is provided within the surface of seabed 48, is the bottom of tower 49 and, formed therein is a water discharge reservoir to the boulder zone 56.

Embodiment 200 differs from prior embodiments primarily in its provision of a multiplicity of turbines 220, each provided water with inputs 226 (above described for each turbine) but which are connected by a common axle 214 which turns a single master generator 230. Each of the turbines 230 is separated by a high pressure chamber 274 having a pressure equal to a hydrostatic pressure of the surrounding ocean 45. Pressurization of chambers 274 and of discharge chamber 276 occurs through conduits 278, the pressure source of which may be located upon the tower platform 41. (See FIG. 17). As in prior embodiments, a seabed cable 247 is provided to a power distribution facility 70 at the shoreline.

Shown in FIG. 18 is a further embodiment 300 which is generally similar to embodiment 200 of FIGS. 16-17, the primary difference being the use of high volume, low head water discharge pumps 380 which are provided peripherally about the bottom of tower 49 permitting water is pumped out of chamber 376 at high volume by low head water discharge pumps 380 into the ocean 45.

The embodiment of FIG. 18 is shown relative to the entire system in FIG. 19, wherein it is indicated that the structure of embodiment 300 may be repeated multiple times as is indicated by packages 300 and 301 in FIG. 19. The combination of turbine packages 300 and 301 in the embodiment of FIG. 19 is shown in greater detail in FIG. 20. Therein, it may be noted that such packages of pluralities of turbines operating upon a single axle 314/314A, pressurized by conduits 378 and having air pressurized water discharge chambers 376/376A for each respective turbine package may be replicated several times between the ocean surface and the seabed. Each discharge chamber is preferably provided with hydraulic discharge pump 380.

FIG. 21 illustrates a variation similar to embodiments of FIGS. 18 and 19 with multiple turbines with single generators in vertical series in which water output (discharge) of the system occurs directly into the ocean or a suspended system.

While there has been shown and described above the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth in the Claims appended herewith.

I claim:

1. A deep-water power generation system, comprising:
   (a) an initially evacuated enclosure having walls of suitable strength or reinforcement for maintaining the structural integrity thereof in deep-water pressures;
   (b) a power axle extending in substantial alignment with a gravity vector through each enclosure from a north pole thereof to a south pole of each enclosure;
   (c) for each power axle a turbine having a multiplicity of blades, the turbine secured upon a support frame secured to said axle in a latitudinal plane of each enclosure;
   (d) a plurality of inlet ports within each enclosure positioned at said latitudinal plane of said blades of said turbine and defining a direction of inflow of ambient high pressure deep-water against said blades, in which couple forces from said fluid flow induces rotation of said blades, the said support frame and said power axle secured to said frame;
   (e) a thrust deck rigidly secured, within said enclosure, to said power axle and above said turbine;
   (f) a generator secured upon said thrust deck, its axis and rate of rotation defined by said power axle extending therethrough; and
   (g) a water output of said enclosure defined at said south pole of said enclosure to expel water from said south pole as said power axle is rotated by said ambient water of said turbine, expelled water from said south pole in communication via a conduit with a well head of a shaft descending to a saline aquifer, said well head located upon or proximally to a seabed.

2. The system as recited in claim 1, further comprising:
   an integral a reinforced geometry defining a bore hole within said well head and passing through geological levels to said saline aquifer.

3. The system as recited in claim 2, further comprising at least one ballast ring and one buoyancy ring secured externally to and about said enclosure.

4. The system as recited in claim 2, further comprising:
   a seabed cable for establishing electrical communication between an electrical output of said generator and a transmission means positioned proximally to a shoreline.

5. The system as recited in claim 2, further comprising:
   an anchor secured to said enclosure to limit rotation thereof during said inflow of ambient deep water, said anchor comprising said integral reinforced geometry.

6. The system as recited in claim 2, further comprising:
   control valves within said inlet ports for regulating admission of said ambient water and thereby a rate of rotation of said blades of said turbine.

7. The system as recited in claim 2, further comprising:
   means for suspension of said enclosure between said seabed and a surface of a body of water with which said system is disposed.

8. The system as recited in claim 1, further comprising:
   control valves within said inlet ports for regulating admission of said ambient water and thereby a rate of rotation of said blades of said turbine.

9. The system as recited in claim 5, in which said well-head and bore handle therethrough define a high positive pressure injection well.

10. The system as recited in claim 2, in which said turbine is selected from the group of a Kaplan, Francis or Pelton-type turbines.

11. A deep-water power generation system, comprising:
    (a) at least two initially evacuated enclosures having walls of suitable strength or reinforcement for maintaining the structural integrity thereof in deep-water pressures;
    (b) a power axle extending in substantial alignment with a gravity vector through each enclosure from a north pole thereof to a south pole of each enclosure;
    (c) for each power axle, a turbine having a multiplicity of blades, the turbine secured upon a support frame secured to each axle in a latitudinal plane of said enclosure;
    (d) a plurality of inlet ports within each enclosure positioned at said latitudinal plane of said blades of said turbine and defining a direction of inflow of ambient high pressure deep-water against said blades, in which forces from said fluid flow induces couple force rotation of said blades, the said support frame and said power axle secured to said frame;
    (e) a thrust deck rigidly secured, within each enclosure, to said power axle and above said turbine;
    (f) a generator secured upon each thrust deck, its axis and rate of rotation defined by said power axle extending therethrough; and
    (g) a water output for each enclosure, outputs thereof defined at said south poles of each enclosure to expel water from said south poles as power axles are rotated by said ambient water of said turbine, expelled water from said south pole in communication via conduits with a well head of a shaft descending to a saline aquifer, said well head located upon or proximally to a seabed.

12. The system as recited in claim 11, further comprising:
    an integral reinforced geometry about a bore hole within said well head, said shaft passing through geological levels to said saline aquifer.

13. The system as recited in claim 12, further comprising:
    a seabed cable for establishing electrical communication between electrical outputs of said generator and transmission means positioned proximally to a shoreline.

14. The system as recited in claim 13, further comprising:
    a central tower about which each of said turbine and generator enclosures are peripherally located, said tower extending upward to a surface-located system control barge, said tower including access means to said enclosures.

15. The system as recited in claim 11, further comprising:
means for suspension of said enclosures between said seabed and a surface of a body of water in which said system is disposed.

16. The system as recited in claim 14, further comprising:
a supply of pneumatic high pressure originating from said control barge and extending downwardly to an air pressurized water discharge chamber in fluid communication with said south pole water outputs of said enclosures,
whereby primary water discharge into said well head is facilitated thereby.

17. The system as recited in claim 16, comprising multiple air pressurized water discharge chambers, in which each chamber communicates with a system enclosure.

18. A deep-water power generation system, comprising:
(a) an initially evacuated enclosure having walls of suitable strength or reinforcement for maintaining the structural integrity thereof in deep-water pressures;
(b) a common power axle extending in substantial alignment with a gravity vector through each of said enclosures from a north pole thereof to a south pole of said enclosure;
(c) a plurality of a turbines having a multiplicity of blades, and secured upon support frames secured about said axle in a latitudinal plane of said enclosure;
(d) a plurality of inlet ports for each turbine positioned at a latitudinal plane of said blades of each turbine and defining a direction of inflow of ambient high pressure deep-water against said blades, in which couple forces from said fluid flow induce rotation of said blades;
(e) a thrust deck rigidly secured, within said enclosure, about said power axle and above said plurality of turbines;
(f) a generator secured upon said thrust deck, its axis and rate of rotation defined by the rotational velocity of said common power axle extending therethrough, said power axle in rigid mechanical communication with an axis of rotation of each turbine; and
(g) a supply of pneumatic high pressure originating from a service control barge and extending downwardly to an air pressurized water discharge chamber in fluid communication with said south pole water outputs of each enclosure,
whereby primary water discharge into said well head is facilitated thereby.

19. The system as recited in claim 18, further comprising:
an output from said discharge chamber expelling water via a conduit to a well head of a shaft descending to a saline aquifer, a well head located upon or proximally to a seabed.

20. The system as recited in claim 18, further comprising:
groups of said plurality of turbines, each group axially disposed within said service tower to said barge at a surface of a body of water within which the system is disposed, each plurality of turbines having a common axle and respective corresponding generators.

21. The system as recited in claim 18, in which said discharge chamber includes hydraulic pumps for expulsion of water from each chamber in excess of a pre-determined pressure.

22. The system as recited in claim 21, further comprising:
means for suspension of said enclosures between said seabed and a surface of a body of water in which said system is disposed.

* * * * *